United States Patent
Franke et al.

(10) Patent No.: US 8,495,782 B2
(45) Date of Patent: Jul. 30, 2013

(54) DEVICE FOR THE PARTIAL REMOVAL OF COATING FROM PIPES, IN PARTICULAR FROM METAL PIPES

(75) Inventors: Bernd Franke, Finnentrop-Schönholthausen (DE); Bernd Koschig, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 199 days.

(21) Appl. No.: 13/077,264

(22) Filed: Mar. 31, 2011

(65) Prior Publication Data
US 2011/0239385 A1    Oct. 6, 2011

(30) Foreign Application Priority Data
Apr. 1, 2010   (DE) .......................... 10 2010 013 870

(51) Int. Cl.
 *B08B 9/023*   (2006.01)
(52) U.S. Cl.
 USPC ........................................... 15/104.04; 15/88
(58) Field of Classification Search
 USPC .............. 15/104.04, 88, 236.07; 30/102, 123, 30/92
 See application file for complete search history.

(56) References Cited

U.S. PATENT DOCUMENTS

| 1,448,877 A | * | 3/1923 | Smith ............................. 30/94 |
| 2,696,627 A | * | 12/1954 | Lewis ........................ 15/104.04 |
| 3,820,420 A | | 6/1974 | Matthews |
| 2002/0129684 A1 | | 9/2002 | Oswald |

FOREIGN PATENT DOCUMENTS

| DE | 186218 | 7/1907 |
| DE | 362836 | 11/1922 |
| DE | 7025599 | 11/1970 |
| DE | 3032232 A1 | 3/1981 |
| DE | 29809658 U1 | 5/1999 |
| DE | 10225086 A1 | 12/2003 |
| DE | 102004035836 A1 | 2/2006 |
| EP | 1112794 A2 | 7/2001 |
| EP | 1797982 A1 | 6/2007 |
| JP | 6146197 U | 3/1986 |

* cited by examiner

*Primary Examiner* — Shay Karls
(74) *Attorney, Agent, or Firm* — The Webb Law Firm

(57) ABSTRACT

The invention relates to a device for the partial removal of coating from pipes, in particular from metal pipes, having a base body, an accommodation area for a pipe formed on the base body, at least two supporting means for supporting the pipe arranged on a first side of the accommodation area, and a scraper head arranged on an opposite side of the accommodation area, wherein the scraper head has two prismatic scraper edges. The invention furthermore relates to the use of a device according to the invention for the at least partial removal of coating from pipes.

10 Claims, 8 Drawing Sheets

Figure 1:
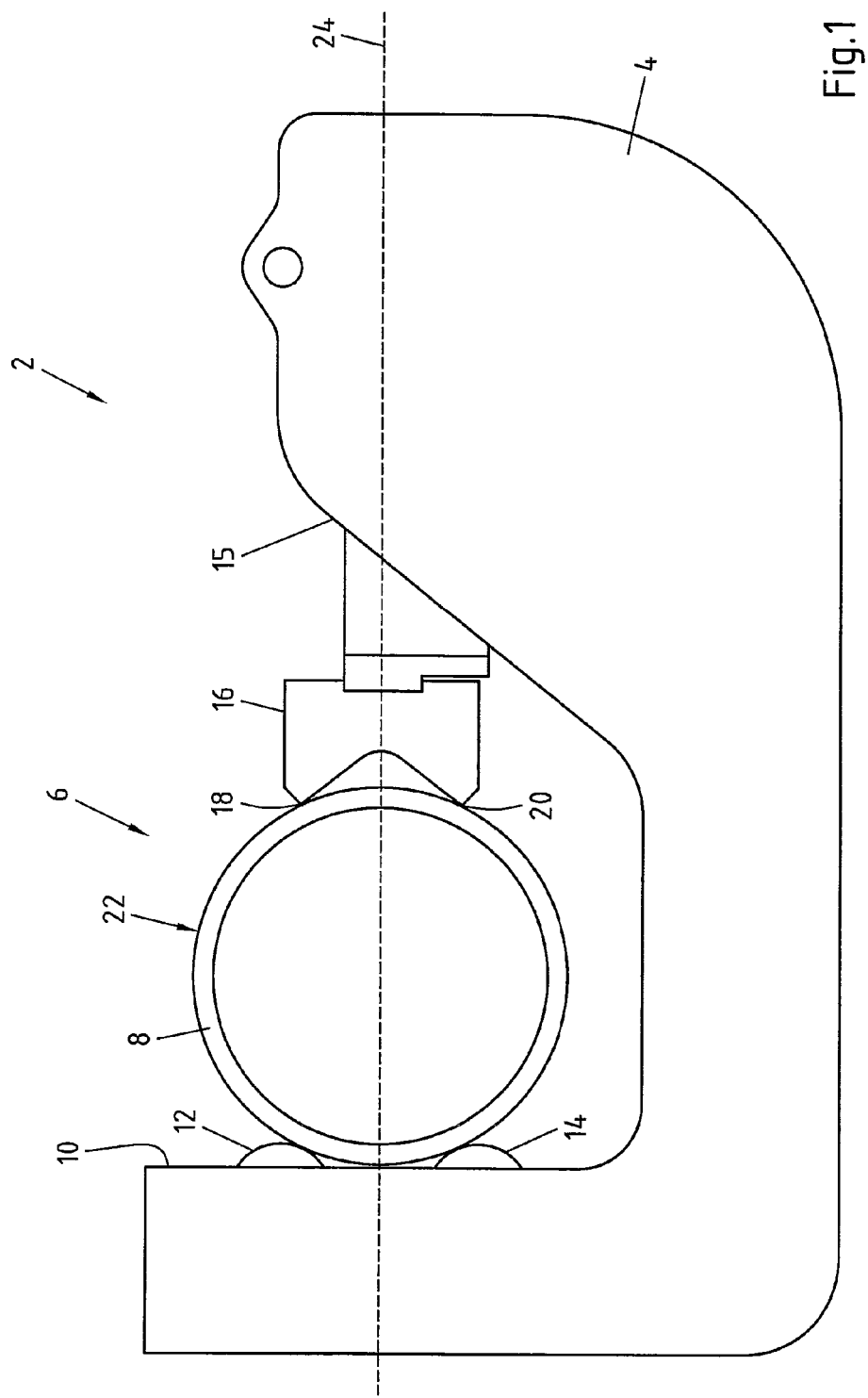

DEVICE FOR THE PARTIAL REMOVAL OF COATING FROM PIPES, IN PARTICULAR FROM METAL PIPES

The invention relates to a device for the partial removal of coating from pipes, in particular from metal pipes, having a base body, in particular a clamp-shaped base body, having an accommodation area, formed on the base body, for a pipe, having at least two supporting means, arranged on a first side of the accommodation area, for supporting the pipe and having a scraper head arranged on the opposite side of the accommodation area.

Metal pipes, in particular thick-walled steel pipes, are often provided with a coating, for example a corrosion protection layer, which is applied to the pipes after production. This protective layer can, in particular, be a shellac coating or another plastic coating. Such coatings, however, have proved to be unfavourable in the region of the end of the pipe when connecting such a pipe to another pipe or to a pipe connector, since these can differ very considerably in their composition and thickness for different pipe producers and are often applied unevenly onto the pipe. In particular, many of these protective coatings have fat edges or wrinkles which lead to an uneven pipe surface. With a surface finish such as this in the region of the end of a pipe, the pipe can only be sealed very poorly or not at all by means of an O-ring at a connection point. Therefore, the protective layer has to be partly removed at least in the region of the end of the pipe before installing a pipe connection. To that end, in the prior art, the surface of the pipe is cleaned with abrasive paper or brushed with a wire brush. However, the grainy surface of the abrasive paper clogs very quickly by abrasion of the protective layer, so that removing the surface layer in this way is only effective to a limited extent. Brushing, on the other hand, requires a very large amount of time, so that preparing the pipe end in such a way for a pipe connection is very laborious.

A peeling tool is known from the prior art of EP 1 112 794 A2 for peeling a plastic coated pipe, which has two supporting means for supporting a pipe and on the opposite side has a blade, so that when the peeling tool is rotated about a coated pipe a coat can be peeled off from the pipe surface.

The present invention is based on the object of providing a generic device for the partial removal of coating from pipes, in particular from metal pipes, in which the handling of the device and the removal of coating from the pipes are improved.

This object is achieved with a generic device according to the invention by the scraper head having two prismatic scraper edges.

It has been identified that the pipe arranged in the device can be fixed better by the two prismatic scraper edges, so that the pipe can be guided more securely in the accommodation area of the base body when the pipe or the device is rotated. The scraper edges are given great stability by means of the prism shape, so that the pipe is securely and uniformly guided in the accommodation area even when the pipe coating is very uneven. The two scraper edges point in the direction of the accommodation area of the base body and preferably lie parallel to one another. In this way, by rotating the pipe or the device in both directions the coating can be removed from the pipe assuredly and reliably. In particular, the prismatic scraper edge, which comes into contact with the pipe surface first, serves to remove the coating from the pipe surface and the second prismatic scraper edge serves to subsequently abrade or smooth the pipe surface which has had the coating removed.

Due to the fact that coating can be removed from a pipe in both rotational directions, it is in particular possible for a pipe to also have its coating removed effectively by means of an oscillating movement, i.e. by means of a back and forth movement. This is particularly advantageous when there is restricted space available or when pipes cannot be rotated freely, for example when pipes are already installed.

A prismatic scraper edge is understood to mean that the scraper head is essentially triangle-shaped in the area of the scraper edge in cross-section, wherein the angle of the triangular shape pointing in the direction of the accommodation area, i.e. the angle on the scraper edge, is in particular between 60° and 120°, preferably more than 80° and/or less than 110°. The side edges of the triangle adjacent to this angle preferably have a length of at least 0.5 cm, in particular of at least 1 cm. In this way, high abrasion resistance and stability of the scraper edges and the scraper head are achieved. The scraper edges preferably have a length of 30 to 50 mm. By the use of this length a preferred compromise is reached between low expenditure of force for operating the device and a sufficient scraper edge width for the effective removal of coating. The scraper head preferably consists of tool steel, in particular carbon steel, since this has a sufficient hardness for the coating removal and a sufficient abrasion resistance.

A clamp-shaped base body is understood to mean a base body having a recess, serving as an accommodation area, which is bounded by the base body in a sectional plane essentially from three sides. The sides of the base body limiting the recess can essentially be arranged at right angles and/or inclined in relation to one another. The sides of the base body limiting the recess can also be at least partly rounded and optionally merge into one another. The recess can, in particular, be partly or substantially circular. Such a recess can be produced particularly easily by boring or shaping.

In one preferred embodiment of the device according to the invention, the two scraper edges are arranged in such a way that they lie on a common inner circle with the two supporting means. In this way, the positions of the scraper edges and the supporting means are optimally adapted to the generally circular cross-section of the pipes which are to have their coatings removed. Preferably, the two scraper edges exert essentially the same force on the pipe surface of a pipe inserted into the device. In this way, the coating removal effect exerted by the scraper edges is equally strong in both rotational directions. A common inner circle is understood to mean the biggest circle which touches the scraper edges and the supporting means.

The uniformity of the coating removal in both rotational directions is improved in another preferred embodiment of the device according to the invention by the two scraper edges and the at least two supporting means being arranged essentially mirror-symmetrically in relation to one another. The pipe can, furthermore, be fixed more stably in the accommodation area by the use of a mirror-symmetrical arrangement. An essentially mirror-symmetrical arrangement of the scraper edges and the supporting means is, in particular, understood to mean that there is a notional mirror plane, in which the mirrored position of the first scraper edge and the first supporting means on this mirror plane in each case essentially corresponds to the position of the second scraper edge and the second supporting means.

In another embodiment of the device according to the invention, the scraper areas, in each case adjacent to one of the scraper edges, have different angles to the plane in which the scraper edge and the centre axis of the common inner circle lie. The scraper area with the smaller angle is referred to as the coating removal area and the scraper area with the larger angle is referred to as the smoothing area. If a pipe with a circular cross-section is now inserted into the accommodation area, then the common inner circle corresponds to the outer surface of the pipe. By means of the different angles, which the scraper areas now have in relation to the pipe surface, the coating removal effect of the scraper edge concerned is improved when the pipe is rotated against a coating removal area, while the smoothing or abrading effect of the scraper edge concerned is improved when the pipe is rotated against a smoothing area. For a coating removal area the angle is preferably between 5° and 45°, in particular more than 10° and/or less than 40°. For a smoothing area the angle is preferably between 30° and 80°, in particular more than 45° and/or less than 75°. The coating removal areas preferably lie on the sides of the scraper edges turned away from one another, while the smoothing areas are preferably arranged on the sides of the scraper edges facing one another.

The operational range of the device according to the invention is widened in another preferred embodiment by the distance between the scraper head and the supporting means being able to be adjusted, preferably via a threaded spindle. In this way, the device can be adapted to different pipe sizes, so that coatings can be removed from pipes with different sized cross-sections using the same device. The distance can be particularly precisely adjusted by means of a threaded spindle. Furthermore, the pressing force of the scraper edges against the pipe surface can be precisely adjusted. The pressing force is, in particular, adapted to the surface coating of the pipes which are to have their coating removed.

In particular, the distance between the scraper head and the support means for obtaining the advantages mentioned before with regard to the common inner circle can be adjusted in such a way that the two scraper edges and the two supporting means at all times lie on a common inner circle. Furthermore, it is preferred if, for essentially each of the adjustable distances between the scraper head and the supporting means, the scraper areas, in each case adjacent to one of the scraper edges, have different angles to the plane in which the scraper edge and the centre axis of the respective common inner circle lie. In this way, the above mentioned advantages of different angles of the coating removal area and the smoothing area are obtained for essentially each of the adjustable distances.

In another embodiment of the device according to the invention, at least one supporting means, preferably all supporting means, are designed as rollers. In this way, the pipe can be rotated easily about the device or the device about the pipe, so that the expenditure of force for coating removal is reduced.

According to another embodiment of the device according to the invention, the coating can be more effectively removed, in particular when there is restricted space available, by at least one supporting means being designed as another scraper head. In this way, the coating can already be removed from the pipe by essentially a half rotation or by a corresponding back and forth movement over the entire circumference. The scraper head has, for this purpose, in particular at least one scraper edge, preferably at least one prismatic scraper edge. The two supporting elements can also particularly preferably be designed as a single scraper head with two scraper edges. A high level of uniform coating removal is in particular achieved by the scraper head, which acts as a supporting means, and the scraper head, which is arranged on the opposite side of the accommodation area, being designed in the same way.

In another preferred embodiment of the device according to the invention, a more uniform coating removal can be achieved by the scraper head and/or the supporting means being spring-loaded. In this way, the pressing forces of the scraper edges essentially remain the same even with a very uneven outer surface of the pipe which is to have its coating removed.

In another embodiment of the device according to the invention, a lateral stop face, aligned transverse to the scraper edges, is provided on the scraper head, which lateral stop face juts out from the scraper head on the side of the scraper edges at least in sections. In this way, coating removal from the end of a pipe, for example to prepare for connecting to a pipe or a pipe connector, is made easier, since the correct relative axial position of the device to the pipe can be ensured by abutting the head end of the end of the pipe on the stop face. Hence, device handling is simplified, since the coating is removed from the correct area of the end of the pipe and without any particular care having to be taken.

In another embodiment of the device according to the invention, device handling is further simplified by a lateral deburring blade, aligned transverse to the scraper edges, being provided on the scraper head, which lateral deburring blade juts out from the scraper head on the side of the scraper edges at least in sections. The edge on the head end of the end of a pipe can be deburred at the same time during coating removal, so that a work step can be saved.

In another preferred embodiment of the device according to the invention, the scraper head has at least one recess in the area of the scraper edges. Owing to the recess, the scraper edge is not in contact with the pipe surface in this area, so that the pipe also does not have the coating removed in this area. As a result, the force required to operate the device is reduced. Preferably, the recess is arranged in such a way that the pipe only has the coating removed in the sealing area of the intended connection to another pipe or a pipe connector. This position can, for example, be the position of an O-ring in a connector. If, at the same time, a stop face is provided on the scraper head, then the correct position of the removed coating area can be maintained without any particular care being required.

The above mentioned object is, in addition, achieved by the use of a device according to the invention for the at least partial removal of coating from pipes. It has been discovered that the coating can be removed particularly easily and effectively from pipes using the device according to the invention. In particular, the device according to the invention can be used for removing a corrosion protection layer, in particular a shellac layer, from a metallic pipe end before connecting the pipe end to a pipe connector. In this way, a metallic pipe end, provided with a corrosion protection layer, can be particularly easily prepared for connecting to a pipe connector. The device is particularly preferably used for removing the coating from thick-walled steel pipes, for example with a pipe wall thickness of at least 1 mm, preferably of at least 2 mm.

Further advantages and features of the invention can be taken from the following description of several exemplary embodiments, in which reference is made to the accompanying drawing.

In the drawing

Figure 2:
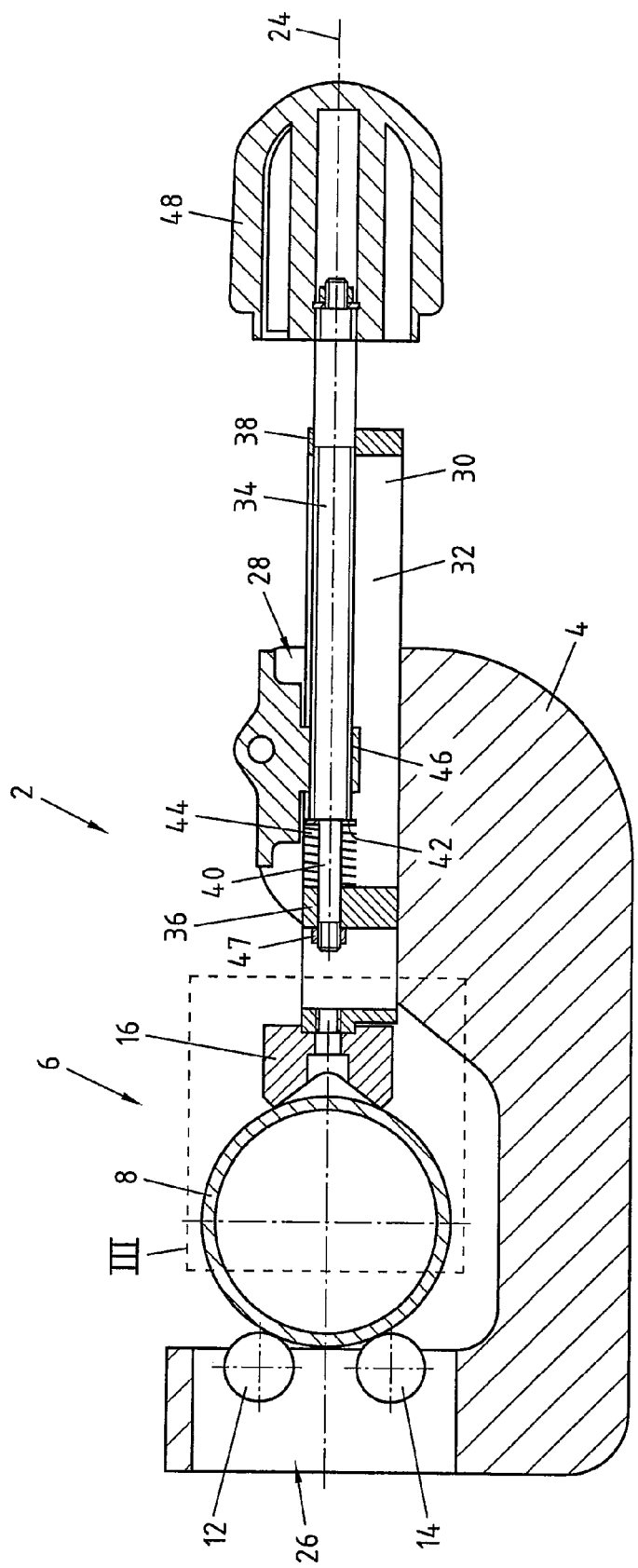
Figure 3:
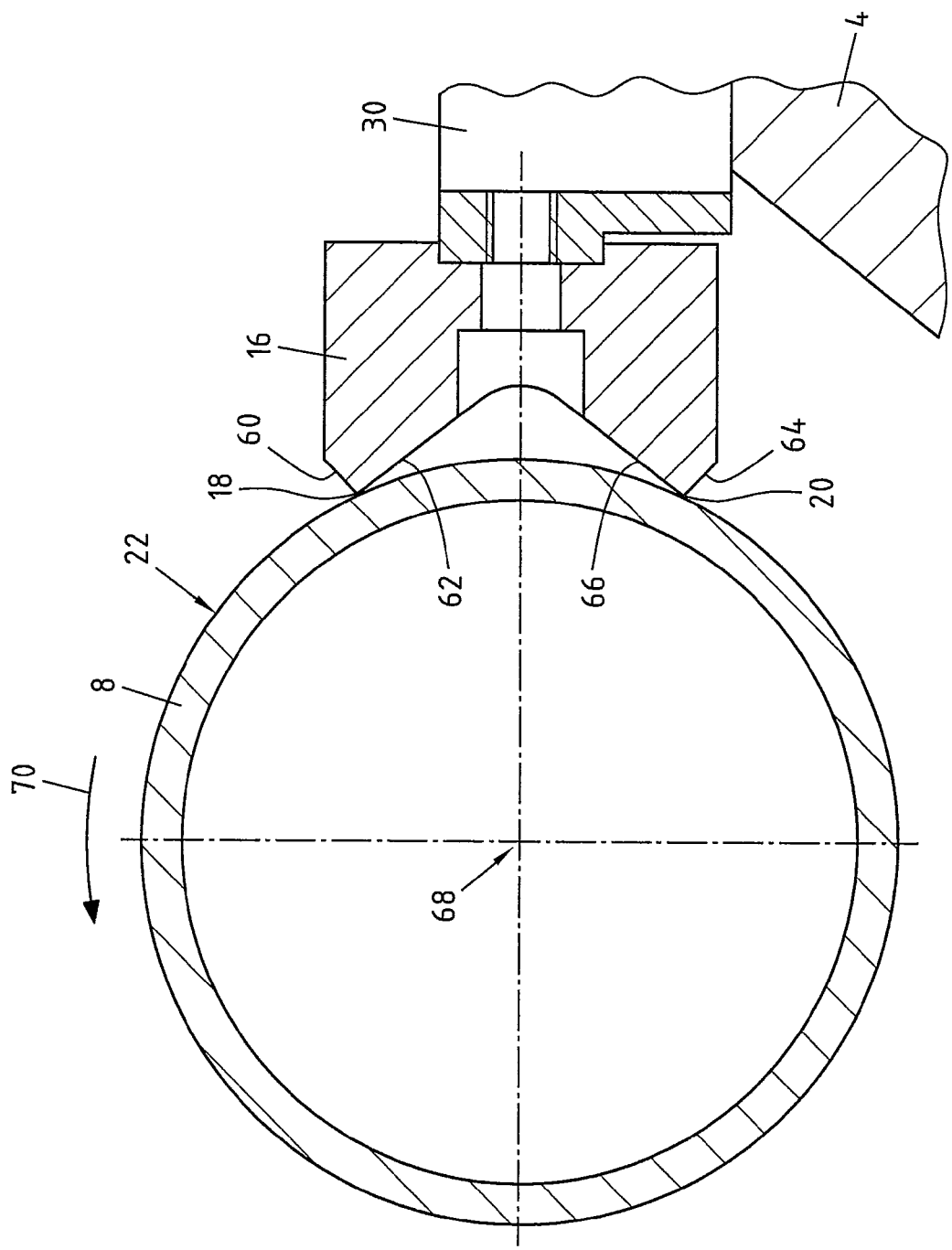
Figure 4A:
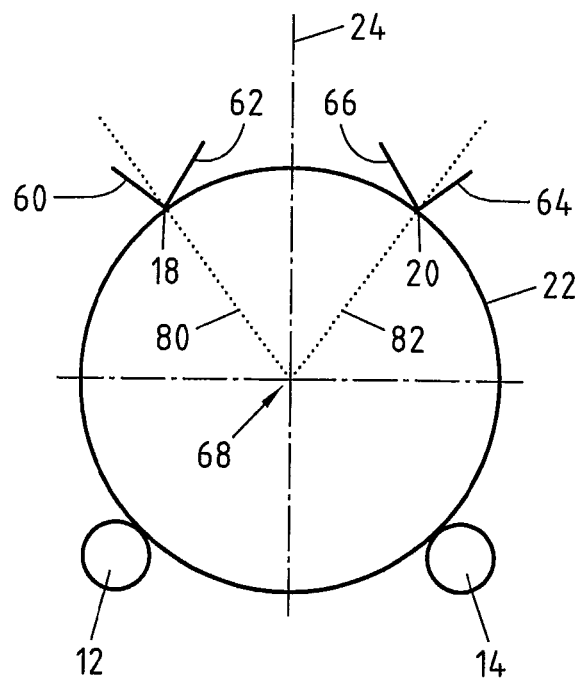
Figure 4B:
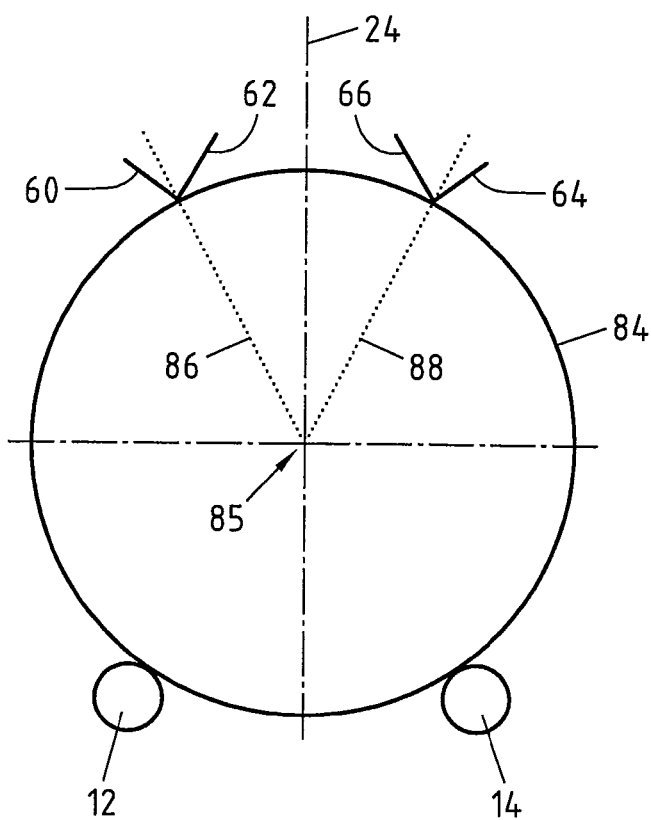
Figure 5:
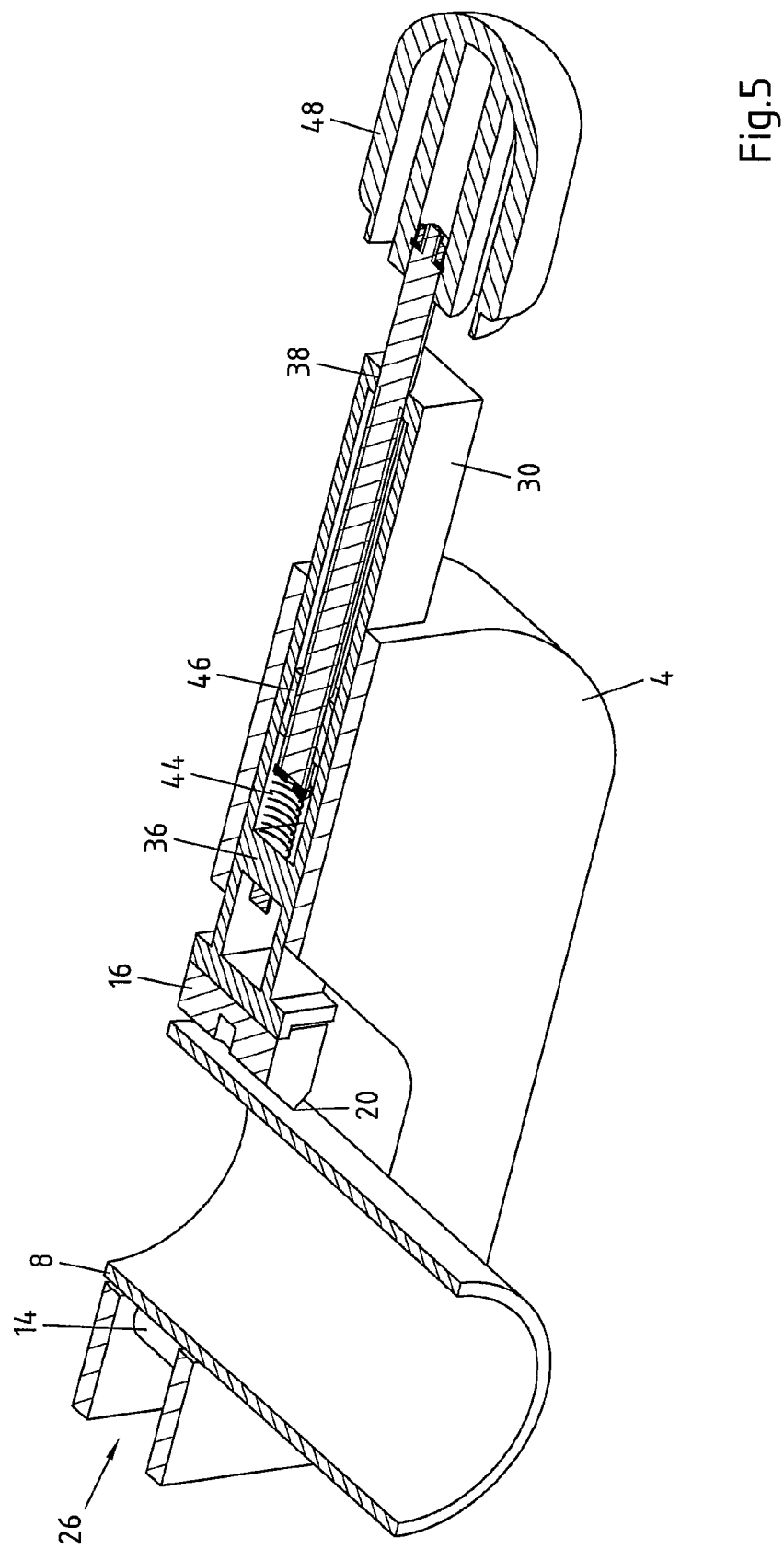
Figure 6:
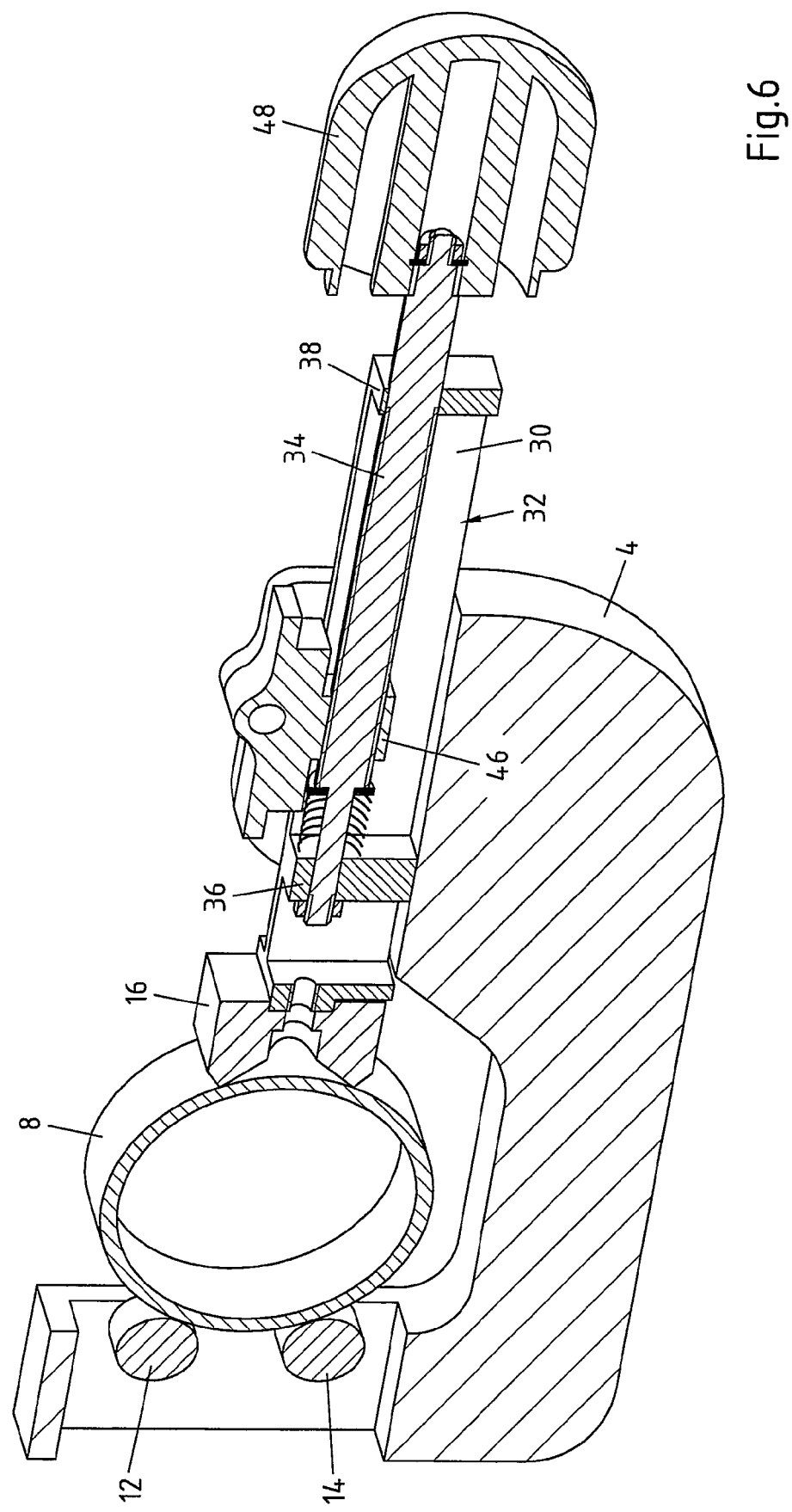
Figure 7:
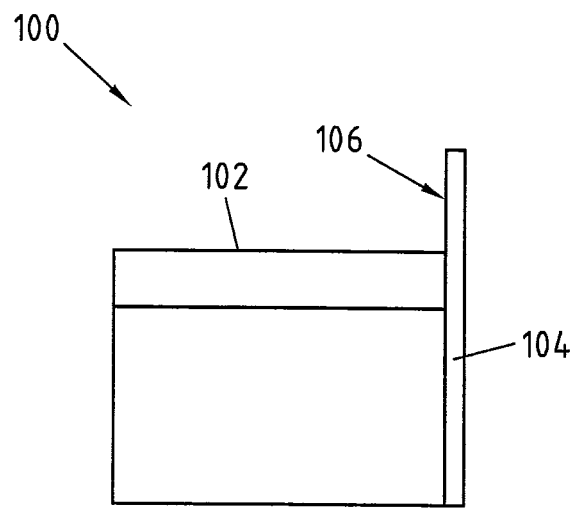
Figure 8:
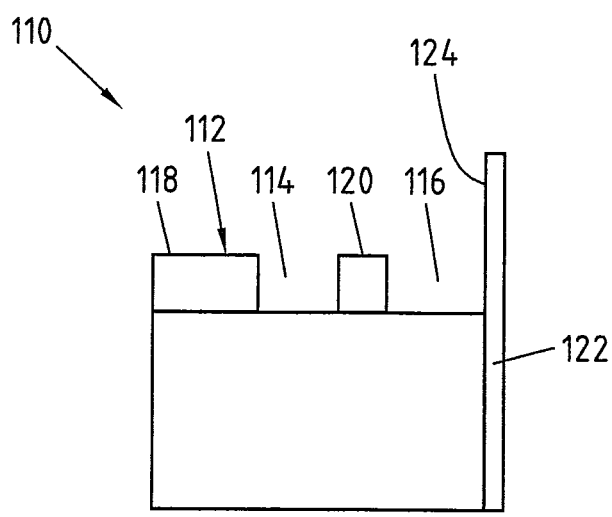
Figure 9:
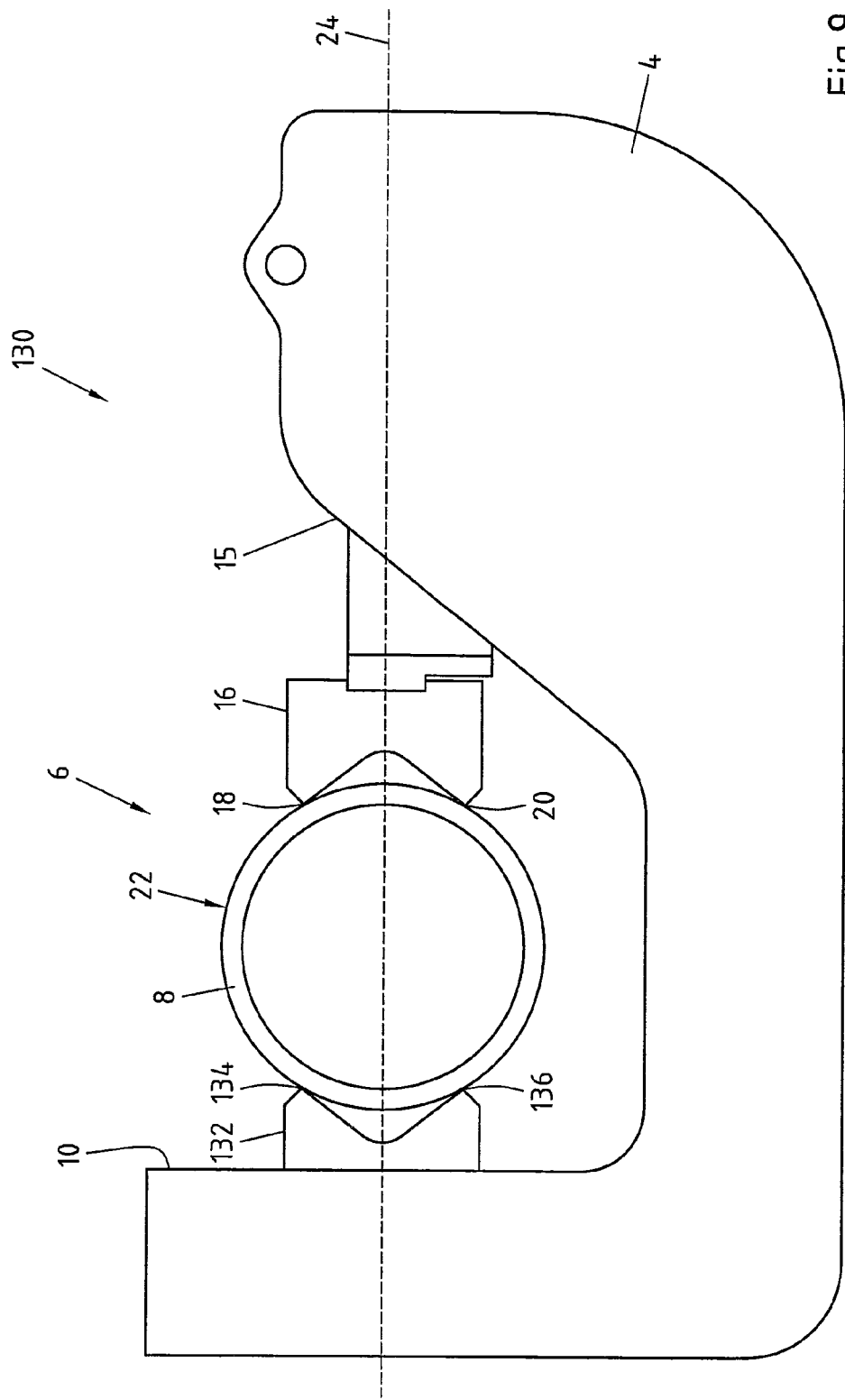

FIG. 1 shows a first exemplary embodiment of a device according to the invention in side view, FIG. 2 shows the exemplary embodiment from FIG. 1 in a cross-sectional representation with a vertical sectional plane, FIG. 3 shows a detail of the cross-sectional view from FIG. 2, FIGS. 4*a-b* show a schematic view of the exemplary body from FIG. 1 in different positions of the scraper head, FIG. 5 shows a perspective sectional view of the exemplary embodiment from FIG. 1 with a horizontal sectional plane, FIG. 6 shows a perspective sectional view of the exemplary embodiment from FIG. 1 with a vertical sectional plane, FIG. 7 shows a scraper head for a second exemplary embodiment of a device according to the invention, FIG. 8 shows a scraper head for a third exemplary embodiment of a device according to the invention and FIG. 9 shows a fourth exemplary embodiment of a device according to the invention in side view.

FIG. 1 shows a first exemplary embodiment of a device according to the invention for the partial removal of coating from pipes. The device 2 has a clamp-shaped base body 4 with an accommodation area 6 for a pipe 8. Two supporting means 12, 14 are arranged on a first side 10 of the accommodation area 6, which in this exemplary embodiment are designed as rollers. Alternatively, the supporting means 12, 14 could be designed, for example, as fixed cylinders or as a scraper head. On the opposite side 15 of the accommodation area 6, a scraper head 16 is provided which has a first 18 and a second prismatic scraper edge 20. The scraper edges 18 and 20 are arranged in such a way that they lie with the two supporting means 12 and 14 on a common inner circle 22 which corresponds in FIG. 1 with the outer surface of the pipe 8. Furthermore, the two scraper edges 18, 20 and the two supporting means 12 and 14 are arranged mirror-symmetrically in relation to one another, wherein the mirror plane 24 is drawn in as a dashed line in FIG. 1.

FIG. 2 shows a cross-sectional representation of the first exemplary embodiment of the device according to the invention from FIG. 1. The base body 4 has a recess 26 in the area of the supporting means 12, 14, which allows free movement of the supporting means 12, 14 designed as rollers. The base body 4, in addition, has a recess 28 on the opposite side 15, in which a push element 30 is arranged. The scraper head 16 is mounted on the end of the push element 30 facing the recess 6 of the base body 4. The push element 30 has a cavity 32 in which a threaded spindle 34 is arranged longitudinally to the direction of extension of the push element 30. The threaded spindle 34 is pivot-mounted by two bearings 36, 38 in the push element 30. The threaded spindle 34 has a thread in sections. Furthermore, at the end of the threaded spindle 34 facing the accommodation area 6, a tapered area 40 and a stop face 42 at the transition to the tapered area 40 are provided. A spring 44 is arranged between the first bearing 36 of the push element 30 and the stop face 42 of the threaded spindle 34. The threaded spindle 34 is fixed in its position relative to the base body 4 by means of a mating thread 46 on the base body 4, which mating thread 46 engages with the thread of the threaded spindle 34. As a result, the push element 30 is pushed by means of the spring 44 in the direction of the accommodation area 6 of the base body 4, so that the scraper edges 18, 20 exert a force on the outer surface of the pipe 8. The scraper head 16 is in this way also spring-loaded.

A turning knob 48 is provided on the end of the threaded spindle 34 turned away from the accommodation area 6 of the base body 4, which turning knob 48 enables the threaded spindle to be turned easily. If now the turning knob 48 is turned clockwise, then the threaded spindle 34 moves towards the accommodation area 6 of the base body 4 due to the mating thread 46 on the base body 4. As a result, the stop face 42 is moved in the direction of the bearing 36, so that the spring 44 is compressed and the force of the scraper edges 18, 20 on the pipe 8 increases. When the turning knob 48 is turned in the opposite direction, the threaded spindle is moved away from the accommodation area 6 of the base body 4, so that the spring 44 relaxes again and as a result the force of the scraper head 16 on the pipe 8 is reduced. In order to prevent the threaded spindle from sliding out of the push element 30, on the side of the first bearing 36 facing the accommodation area 6 of the base body 4 locking means are provided in the form of a locking pin 47 on the threaded spindle 34. Instead of a locking pin 47, alternatively other locking means, like for example a fixed, in particular a glued-in nut, a shaft locking device or the like, can also be provided.

By turning the turning knob 48, the scraper head can be moved towards or away from the supporting means 12, 14, so that pipes with different pipe cross-sections can be handled by the device 2. The scraper head 16 preferably moves in such a way that the two scraper edges 18, 20 and the two supporting means 12, 14 essentially lie on a common inner circle at any point in time in the entire movement.

FIG. 3 shows an enlarged representation of the section of the device 2 marked with III in FIG. 2. The scraper edges 18, 20 of the scraper head 16 are prismatically formed. This means that the scraper head 16 has an essentially triangular cross-section in the area of the scraper edges 18, 20. The scraper areas 60, 62 adjacent to the scraper edge 18 and the scraper areas 64, 66 adjacent to the scraper edge 20 in each case enclose an angle between 60° and 120°, preferably between 80° and 110°, at the scraper edges 18, 20. The width of the scraper areas 60, 62, 64, 66 is preferably at least 0.5 cm, particularly preferably at least 1 cm. The scraper areas 62 and 66 have a larger angle to the plane in which the respective scraper edges 18 and 20 and the centre axis 68 of the common inner circle lie than the scraper areas 60 and 64. Therefore, the scraper areas 64 and 62 are referred to as smoothing areas and the scraper areas 60 and 64 are referred to as coating removal areas.

When the pipe 8 is rotated in the direction of the arrow 70, the surface coating of the pipe 8 is at least partly removed on the scraper edge 20 and the surface of the pipe 8 partly removed of coating is abraded or smoothed on the scraper edge 18. Rotation of the pipe 8 takes place then against the coating removal area 64 and against the smoothing area 62. When the pipe is moved against the direction of the arrow 70, removal of coating takes place on the scraper edge 18 and smoothing or abrading takes place on the scraper edge 20. The removal of coating is benefited by the smaller angles of the scraper areas 60, 64 designed as coating removal areas, while the abrading or smoothing is benefited by the larger angles of the scraper areas 62, 66 designed as smoothing areas.

In FIGS. 4a and 4b, the angles of the scraper areas 60, 62, 64, 66 are illustrated schematically with different pipe diameters and different inner circles. In FIG. 4a, the plane 80, in which the scraper edge 18 and the centre axis 68 of the common inner circle 22 lie, is illustrated as a dotted line. Furthermore, the plane 82, in which the scraper edge 20 and the centre axis 68 lie, is also illustrated as a dotted line. The centre axis 68 runs perpendicular to the viewing plane in FIG. 4a. The outer scraper areas 60 and 64, which are adjacent to the scraper edges 18 and 20 respectively, cut the planes 80 and 82 respectively at a smaller angle than the scraper areas 62 and 66 pointing inwards.

In FIG. 4b, the distance between the scraper head (not shown) and the supporting means 12, 14 is greater than in FIG. 4a, so that the common inner circle 84 and with it the pipe size suiting this adjustment to the device are also increased. The centre axis 85 of the inner circle 84 runs perpendicular to the viewing plane. The planes 86 and 88, corresponding to the planes 80 and 82 from FIG. 4a, now enclose a smaller angle with the mirror-symmetry plane 24. All the same, the outer scraper areas 60 and 64 still have a lesser angle to the planes 86 and 88 respectively than the scraper areas 62 and 66. Therefore, it can be ensured for a range of different pipe sizes that the scraper areas 60 and 64 act as coating removal areas and the scraper areas 62 and 66 act as smoothing areas.

FIGS. 5 and 6 show two perspective sectional views of the exemplary embodiment of the device according to the invention from FIG. 1, namely with a horizontal sectional plane in FIG. 5 and a vertical sectional plane in FIG. 6.

In order to now remove the coating from a pipe with a device according to the invention, for example with the exemplary embodiment of the device shown in FIG. 1, the device 2 is firstly slid onto the pipe 8 which is to have its coating removed. Then, by turning the turning knob 48 the scraper head 16 is moved in the direction of the supporting elements 12, 14 until the scraper edges 18, 20 are pressed with the desired force onto the outer surface of the pipe by the spring 44. The spring 44 is at this point in time tensioned. The device 2 is now rotated about the pipe 8 or alternatively the pipe 8 is rotated in the device 2. The pressing force of the scraper edges 18, 20 is preferably set in such a way that the coating, for example the shellac layer, is sufficiently removed from the pipe 8 after three to five rotations.

FIG. 7 shows a scraper head 100 for a second exemplary embodiment of a device according to the invention in a top view. The scraper head 100 has a first prismatic scraper edge 102 and a second prismatic scraper edge which in this illustration is hidden by the first scraper edge 102. The scraper head 100 in addition has a lateral plate 104 which provides a stop face 106 aligned transverse to the scraper edges. This stop face 106 juts out from the scraper head 100 on the side of the scraper edges. A pipe to have its coating removed can now be inserted into the recess of the corresponding device until the head end of the pipe abuts on the stop face 106. In this way, the axial position of the scraper head 100 in relation to the pipe to be treated is preset by the stop face 106. The plate 104 can alternatively or additionally also be designed as a deburring blade (not shown), so that the head end of a pipe end can be deburred at the same time during coating removal.

FIG. 8 shows a scraper head 110 for a third exemplary embodiment of a device according to the invention. The scraper head 110 differs from the scraper head 100 shown in FIG. 7, in that the scraper edge 112 has recesses 114, 116, so that the scraper edge 112 protrudes in two areas 118, 120 separate from one another. In this way, a pipe inserted into the corresponding device only has its coating removed in these areas. As a result, the effective length of the scraper edge 112 is reduced, so that the coating removal can be carried out with less force. By means of the plate 122, which is provided on the side, and the stop face 124 thereby provided, it is ensured that the correct areas of the end of the pipe have their coating removed by the areas 118 and 120 of the scraper edge 112. Of course, the invention is not restricted to two recesses. It is, in fact, also possible to provide just one recess or several recesses. The recesses, in particular, can be adapted to the sealing areas of the pipe connector to be connected to the end of the pipe. An area of the scraper edge is thus preferably arranged at the subsequent axial position of the sealing element of the connection.

FIG. 9 shows a fourth exemplary embodiment of a device according to the invention. The device 130 differs from the device 2 shown in FIG. 1, in that the supporting elements are designed as another scraper head 132 having two scraper edges 134, 136. The components of the devices 2 and 130 corresponding with one another are provided with the same reference symbols. By means of the scraper edges 134, 136, the pipe 8 arranged in the device 2 is, on the one hand, supported and, on the other hand, has its coating removed when the device 130 is rotated about the pipe 8. In this way, the coating can already be removed from the pipe by a half rotation or by a corresponding back and forth movement of the device 130 on the entire circumference. This is particularly advantageous if the space available does not allow a full rotation of the device 130. The scraper heads 16 and 132 are designed in the same way in FIG. 9. It is, however, also possible to provide different configurations of the scraper heads 16 and 132. Alternatively, the two supporting elements can, for example, also be designed as two individual scraper heads having a scraper edge in each case.

The invention claimed is:

1. A device for the partial removal of coating from pipes comprising:
    a base body,
    an accommodation area, formed on the base body, for a pipe,
    at least two supporting means, arranged on a first side of the accommodation area, for supporting the pipe,
    a scraper head arranged on an opposite side of the accommodation area,
    wherein
    the scraper head has two prismatic scraper edges having essential triangle-shaped cross-sections,
    wherein the two scraper edges are arranged in such a way that they lie on a common inner circle with the at least two supporting means, and
    wherein the supporting means are rollers or fixed cylinders.

2. The device according to claim 1, wherein the two scraper edges and the at least two supporting means are arranged essentially mirror-symmetrically in relation to one another.

3. The device according to claim 1, wherein scraper areas, in each case adjacent to one of the scraper edges, have different angles to the plane in which the scraper edge and a centre axis of the common inner circle lie.

4. The device according to claim 1, wherein the distance between the scraper head and the supporting means can be adjusted, preferably via a threaded spindle.

5. The device according to claim 1, wherein at least one supporting means is designed as another scraper head.

6. The device according to claim 1, wherein the scraper head, the supporting means, or both are spring-loaded.

7. The device according to claim 1, wherein a lateral stop face, aligned transverse to the scraper edges, is provided on the scraper head, which lateral stop face juts out from the scraper head on the side of the scraper edges at least in sections.

8. The device according to claim 1, wherein a lateral deburring blade, aligned transverse to the scraper edges, is provided on the scraper head, which lateral deburring blade juts out from the scraper head on the side of the scraper edges at least in sections.

9. The device according to claim 1, wherein the scraper head has at least one recess in the area of the scraper edges.

10. The device according to claim 1, wherein the device is capable of use for at least partial removal of coating from pipes.

* * * * *